Patented Dec. 5, 1933

1,938,532

UNITED STATES PATENT OFFICE 1,938,532

METHOD OF POLYMERIZING, CONDENSING, AND OXIDIZING TALLOIL AND THE RESULTING PRODUCT

Richard H. Patch, Jenkintown, Pa., and Fritz Dambacher, Chemnitz, Germany, assignors to E. F. Houghton and Company, Philadelphia, Pa., a corporation of Pennsylvania No Drawing. Application July 16, 1932
Serial No. 623,018

14 Claims. (Cl. 87—12)

Our invention relates to a novel process of treating talloil and to the resulting product, and more particularly it relates to a process of refining and polymerizing talloil whereby a product of new and desirable properties will be obtained.

One object of our invention is to provide a process for preparing a refined, polymerized and/or condensed talloil which has none of the disagreeable properties of the original talloil and, therefore, will find use in applications in the industries where the crude talloil is excluded because of its properties.

A further object of our invention is to provide a process of treating talloil by which the talloil is rendered non-sludging and free from odor and is given additional and valuable properties.

Still another object of our invention is to provide a new product obtained from crude talloil in which the talloil is refined, polymerized and/or condensed, which product is applicable for many technical purposes; for example, in the manufacture of emulsifiable or non-emulsifiable oils for cooling purposes in cutting metals, and in the preparation of protective coatings, as well as in the formation of articles where the binding and adhesive properties of the new product function.

Other objects will be apparent from a consideration of the specification and claims.

Talloil is at the present time produced in Europe for the most part, although it is available in this country. It may be defined as a waste material or by-product oil which is recovered from the wood of coniferous trees during the process of conversion of the wood fibre into cellulose by the so-called sulphate or Swedish process for cellulose pulp making. This process involves the treatment of shipped raw wood with a boiling solution of sodium bi-sulphate and sodium sulphate. The residual waste liquor obtained from this process after the separation of the cellulose pulp therefrom separates into two layers, the top layer of which is skimmed off and represents the crude talloil. The application of talloil in the industries has been very restricted due to its penetrating peculiar tarry odor and the tendency of the talloil to form a sludge, particularly on long standing. Various methods have been suggested in an endeavor to overcome these disagreeable properties. These methods are for the most part based on the combination of talloil with other reactive unsaturated compounds or drying or semi-drying oils. It has also been suggested to treat talloil with wet or superheated steam with or without the simultaneous application of pressure. In all of the processes of the prior art, the treatment of talloil is carried on in the absence of air or free oxygen.

The present invention is characterized by the treatment of the crude talloil with oxygen. The oxygen may be supplied to the crude talloil from a gaseous source as either pure or diluted oxygen; for example, as air or other oxygen-bearing gas, or it may be supplied from an oxygen-liberating substance. It will thus be seen that the oxygen may be either in a molecular state as it exists in pure oxygen or in air, or it may be in a nascent state as it is supplied from an oxygen-liberating substance.

The treatment of the crude talloil with the oxygen is carried out at elevated temperatures, preferably ranging from about 180° F. to 380° F. and for an extended time; for example, from twenty to fifty hours, depending upon the presence or absence of catalytic substances, the temperature, the pressure, and the concentration of the oxygen. The process may be operated at atmospheric pressure or under reduced pressure, and talloil-soluble catalysts may be employed to facilitate the reaction. During the refining treatment of the talloil with oxygen, polymerization oxidation and condensation both occur. The lower temperatures favor polymerization and oxidation whereas at higher temperatures and under reduced pressures the condensation reaction will be favored with the splitting off of water. In any event, these reactions occur simultaneously in the process herein described, although the ratio between the reactions depends upon the pressure and temperature employed. Hereinafter, in the specification and claims, the reaction will be termed "condensation" even though other reactions including oxidation take place simultaneously with the condensation. In the production of the product of the present invention, water is always formed as a by-product, although the amount thereof may vary.

Examples of oxygen-liberating substances which are applicable for use in the treatment of the crude talloil are the perborates, the persulphates, and the permanganates, particularly the alkali metal salts of these compounds such as sodium and potassium. Various talloil-soluble catalytic substances may be employed and the resinate compounds of elements with an atomic weight between 52 and 65 are particularly applicable, although other resinates and abietates may be used as they are soluble in the crude talloil. Heavy metal soaps may also be used as catalysts but these are not as effective as the resinates.

Example I 250 grams of crude talloil are mixed with 12½ grams of iron resinate and the mixture heated to 230° F. for forty hours. During the heating, air is passed into the vessel and the mixture is brought in contact with the air by agitation. After cooling, a heavy oil will result which is odorless and which will not precipitate any sludge.

Example II 100 grams of crude talloil are heated with 5 grams of sodium perborate under a pressure of 23.25 inches of mercury or less. After twenty hours heating at 257° F., a reddish-black, odorless oil is obtained. During the heating, if desirable or necessary, further additions of sodium perborate may be used.

Example III 600 grams of crude talloil are heated under a pressure of 23.25 inches of mercury or less in an oxygen atmosphere at temperatures between 280° F. and 380° F. After twenty hours heating in the presence of oxygen, a clear, odorless oil is produced. After the reaction has proceeded for several hours, a violent evolution of water is observed.

Example IV 300 grams of crude talloil are heated under atmospheric pressure and oxygen is blown through the oil. The temperature is kept at 290° F. for thirty-five hours, during which time the passage of oxygen through the oil is continued. After cooling, a dark oil results which is non-sludging, having only a very weak talloil odor.

Example V 25 grams of aluminum resinate are dissolved in 600 grams of crude talloil. Thereafter 30 grams of sodium persulphate are added and the whole mixture is rapidly heated to 310° F. After keeping the oil at this temperature for about two to three hours, the oil is cooled to a temperature in the neighborhood of 270° F. and maintained at this temperature for about twenty-five hours. The resulting product is a dark clear, odorless, non-sludging oil of medium viscosity.

The new talloil product obtained by this reactions is an odorless, refined product of a dark, clear, oily nature having a reddish transparence The product will not deposit any sludge even on long standing. This property together with the odorless nature of the product makes it available for many commercial purposes where the talloil has heretofore not been applicable due to its unpleasant and unsatisfactory qualities. The new product varies somewhat in physical constants, depending upon the process employed but regardless of the process, marked improvements in physical properties are obtained. In a typical case, crude talloil whose viscosity is 985 Saybolt at 100° F. is treated with manganese resinate as a catalyst in a manner similar to that described in Example I. At the end of the treatment the, viscosity is 166 Saybolt at 210° F. and above 3,000 Saybolt at 100°F. When the same crude talloil is treated with aluminum resinate as a catalyst, its viscosity at 100°F. is over 2,000 Saybolt. The specific gravity of crude talloil is .963 which is increased to .992 when treated in the presence of oxygen and a catalyst of manganese resinate, and is increased to .980 when alumium resinate is used as a catalyst. The iodine number of crude talloil varies from 110 to 128 while that of the treated material varies from 87 to 93.

The talloil product of the present invention may be used by itself or in combination with semi-drying oils, drying oils, tar oils, and petroleum products of various grades and origins. In addition, the treated talloil may be used in the manufacture of emulsifiable or non-emulsifiable oils for cooling purposes in cutting metals. The new product is particularly advantageous in such use due to its excellent rust- and corrosion-preventing properties and for other uses where its high adhesiveness is desirable. These properties may also be used to advantage in the formation of protective coatings and the like where corrosion problems are involved.

Considerable modification is possible in the amount of catalysts, the temperatures, pressures, and times of treatment employed as well as in other factors without departing from the essential features of our invention.

We claim:

1. The method of treating talloil which comprises subjecting crude talloil to oxygen at a temperature and for a time sufficient to condense and refine said talloil to form a substantially odorless, non-sludging, dark, clear oil.

2. The method of treating talloil which comprises subjecting crude talloil to oxygen at a temperature from about 180° F. to about 380° F. for a time in the neighborhood of twenty to fifty hours to refine and condense said talloil to form a substantially odorless non-sludging, dark, clear oil.

3. The method of treating talloil which comprises subjecting crude talloil to oxygen at a temperature and in the presence of a talloil-soluble catalyst for a time sufficient to condense and refine said talloil to form a substantially odorless, non-sludging, dark, clear oil.

4. The method of treating talloil which comprises subjecting crude talloil to oxygen at a temperature from about 180° F. to about 380° F. in the presence of a talloil-soluble catalyst for a time in the neighborhood of twenty to fifty hours to refine and condense said talloil to form a substantially odorless non-sludging, dark, clear oil.

5. The method of treating talloil which comprises subjecting crude talloil to oxygen at a temperature and in the presence of a soluble resinate for a time sufficient to condense and refine said talloil to form a substantially odorless, non-sludging, dark, clear oil.

6. The method of treating talloil which comprises subjecting crude talloil to oxygen at a temperature from about 180° F. to about 380° F. for a time in the neighborhood of twenty to fifty hours in the presence of a soluble resinate to refine and condense said talloil to form a substantially odorless non-sludging, dark, clear oil.

7. The method of treating talloil which comprises subjecting crude talloil to oxygen at a temperature and in the presence of a resinate of elements with an atomic weight between 52 and 65 for a time sufficient to condense and refine said talloil to form a substantially odorless, non-sludging, dark, clear oil.

8. The method of treating talloil which comprises subjecting crude talloil to oxygen at a temperature from about 180° F. to about 380° F. for a time in the neighborhood of twenty to fifty hours in the presence of a resinate of elements with an atomic weight between 52 and 65 to refine and condense said talloil to form a substantially odorless, non-sludging, dark, clear oil.

9. The method of treating talloil which comprises subjecting crude talloil to oxygen at a temperature and under reduced pressure for a time sufficient to condense and refine said talloil to form a substantially odorless, non-sludging, dark, clear oil.

10. The method of treating talloil which comprises subjecting crude talloil to oxygen at a temperature from about 180° F. to about 380° F. for a time in the neighborhood of twenty to fifty hours under reduced pressure to refine and condense said talloil to form a substantially odorless non-sludging, dark, clear oil.

11. The method of treating talloil which comprises mixing crude talloil with an oxygen-liberating substance, and thereafter heating it at a temperature from about 180° F. to about 380° F. for a time in the neighborhood of twenty to fifty hours to refine and condense said talloil to form a substantially odorless, non-sludging, dark, clear oil.

12. The method of treating talloil which comprises mixing crude talloil with sodium perborate, and thereafter heating it at a temperature from about 180° F. to about 380° F. for a time in the neighborhood of twenty to fifty hours to refine and condense said talloil to form a substantially odorless non-sludging, dark, clear oil.

13. As a new product of manufacture, the reaction product obtained by subjecting crude talloil to oxygen at a temperature and for a time sufficient to condense and refine said talloil to form a substantially odorless, non-sludging, dark, clear oil.

14. As a new product of manufacture, the reaction product obtained by subjecting crude talloil to oxygen at a temperature from about 180° F. to about 380° F. for a time in the neighborhood of twenty to fifty hours.

RICHARD H. PATCH.
FRITZ DAMBACHER.